(12) United States Patent
Jonas et al.

(10) Patent No.: US 10,913,165 B1
(45) Date of Patent: Feb. 9, 2021

(54) ROTATING END OF ARM TOOL INCLUDING ASYMMETRICAL INDEPENDENTLY CONTROLLABLE SUCTION ZONES

(71) Applicant: Amazon Technologies, Inc., Seattle, WA (US)

(72) Inventors: Jude Jonas, Hudson, NH (US); Bertan Atamer, Hudson, MA (US); Gregory Thomas Merlino, Westford, MA (US); Gregory Coleman, Somerville, MA (US); Robert Kevin Katzschmann, Cambridge, MA (US); Erica Aduh, Cambridge, MA (US); Manikantan Nambi, Malden, MA (US); Beth A. Marcus, Bedford, MA (US); Kristin Covelle, Arlington, MA (US); Areej Pirzada, Lexington, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/586,568

(22) Filed: Sep. 27, 2019

Related U.S. Application Data

(60) Provisional application No. 62/855,905, filed on May 31, 2019.

(51) Int. Cl.
*B25J 15/06* (2006.01)
*B65G 47/91* (2006.01)

(52) U.S. Cl.
CPC .......... *B25J 15/0683* (2013.01); *B65G 47/91* (2013.01)

(58) Field of Classification Search
CPC ............... B25J 15/0683; B25J 15/0625; B25J 15/0052; B65G 47/91
USPC ................... 294/65, 64.3, 183, 186
See application file for complete search history.

(56) References Cited

U.S. PATENT DOCUMENTS

| | | | | |
|---|---|---|---|---|
| 5,603,599 A | * | 2/1997 | Wesslen | B65B 43/185 414/411 |
| 5,609,377 A | * | 3/1997 | Tanaka | B65G 47/918 294/65 |
| 6,131,973 A | * | 10/2000 | Trudeau | B25J 15/0616 294/186 |
| 6,416,274 B2 | * | 7/2002 | Tokuno | A47F 10/06 198/468.4 |
| 9,168,642 B2 | * | 10/2015 | Cho | B65G 47/91 |
| 10,611,037 B1 | * | 4/2020 | Polido | B65G 61/00 |
| 10,611,580 B1 | * | 4/2020 | Polido | B65G 47/917 |
| 2019/0047158 A1 | * | 2/2019 | Petrovski | B65G 47/91 |
| 2019/0240847 A1 | * | 8/2019 | Quast | B25J 15/0616 |
| 2020/0262069 A1 | * | 8/2020 | Douglas | B25J 19/026 |

\* cited by examiner

*Primary Examiner* — Paul T Chin
(74) *Attorney, Agent, or Firm* — Kilpatrick Townsend & Stockton LLP

(57) ABSTRACT

Examples described herein are directed to an item manipulation system that includes an end of arm tool. The end of arm tool includes a suction manifold including multiple independently controllable asymmetrical suction zones. The end of arm tool is also configured to rotate about a tool axis to selectively align the independently controllable asymmetrical suction zones with target items for manipulation.

20 Claims, 11 Drawing Sheets

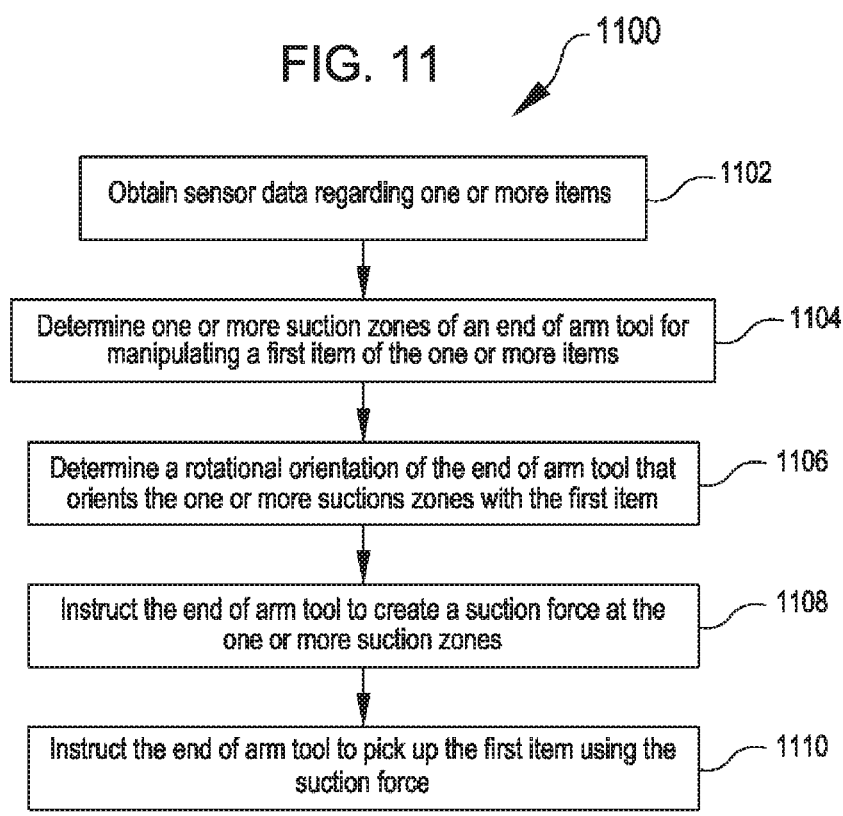

ROTATING END OF ARM TOOL INCLUDING ASYMMETRICAL INDEPENDENTLY CONTROLLABLE SUCTION ZONES

CROSS-REFERENCE TO RELATED APPLICATIONS

This application claims the benefit of and priority to U.S. Provisional Application No. 62/855,905, filed May 31, 2019, entitled "End of Arm Tool for the Manipulation and Grasping of Objects," The disclosure of this application is incorporated by reference herein in its entirety.

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators perform tasks under the same conditions. For example, a robotic manipulator may include an end effector that is specialized to grasp a particular class of objects from known or fixed orientations. If different objects (e.g., those having different dimensions, surface properties, and other differences) or objects in unknown orientations are encountered, however, the robotic manipulator may be unable to achieve a grasp. Because of this, other systems that rely on the object being manipulated may be impacted and the benefits of the robotic manipulator may be minimized.

BRIEF DESCRIPTION OF THE DRAWINGS

Various examples in accordance with the present disclosure will be described with reference to the drawings, in which:

FIG. 11 illustrates a flowchart depicting a process for manipulating an item, according to at least one example.

DETAILED DESCRIPTION

Figure 1:
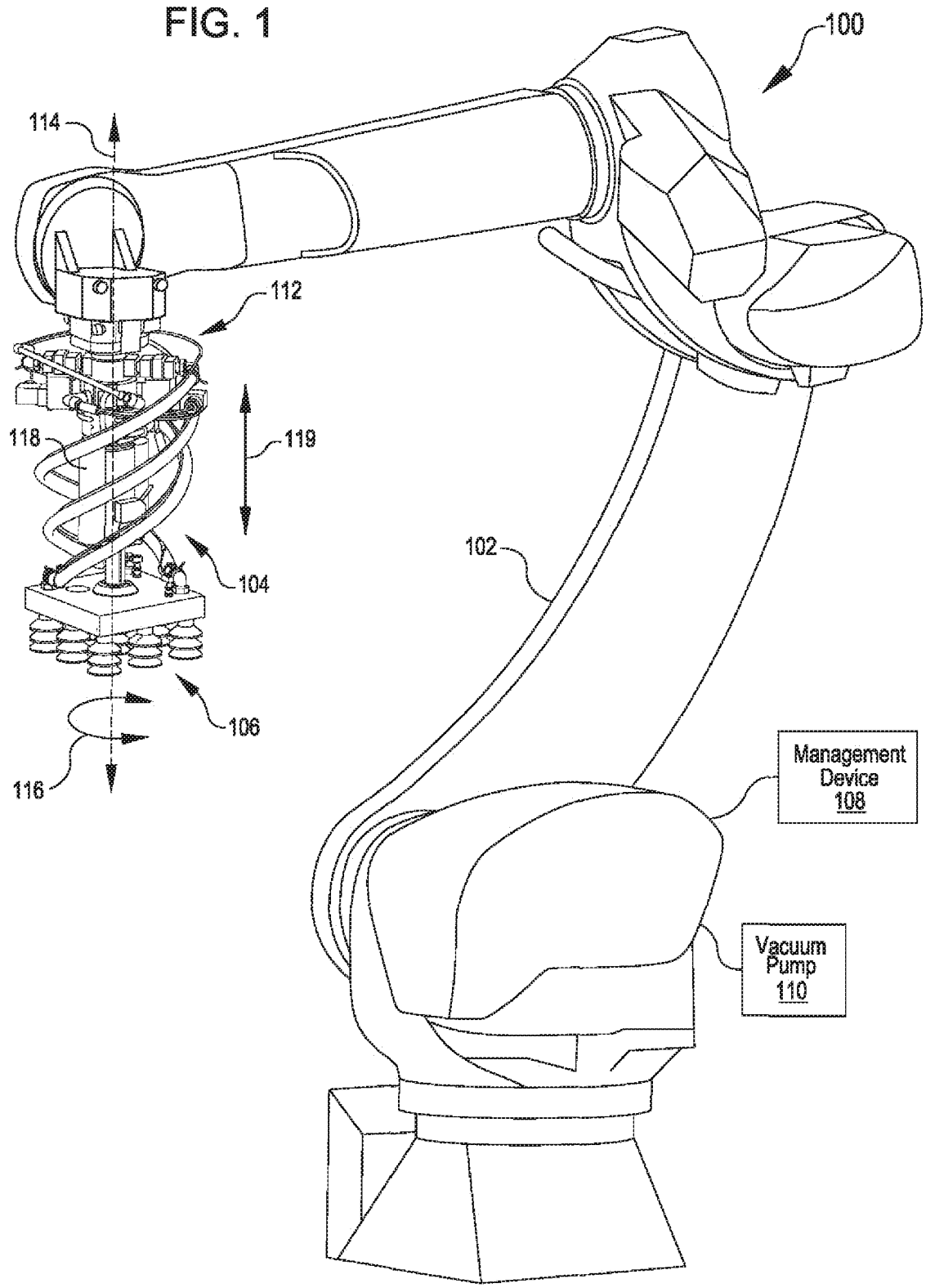
FIG. 1 illustrates a perspective view of item manipulation system including a robotic manipulator and an end of arm tool having a suction manifold including asymmetrical independently controllable suction zones, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to an end of arm tool that is configured to manipulate multiple different types of items—such as those found in inventory storage and retrieval systems—using a suction head. In particular, the end of arm tool may be suitable for picking up bubble mailers, letters, envelopes, books, cardboard boxes, and other items having generally planar surfaces. To enable manipulation of such a diverse set of items, the end of arm tool provides 360 degrees of rotation and passive vertical compliance. In addition, the suction head includes two or more asymmetrical independently controllable suction zones. The rotational freedom coupled with the asymmetrical independently controllable suction zones enable the end of arm tool to align independent suction zones with a target item. Because each zone is independently controllable and asymmetrical, unlike suction heads that do not have controllable zones or suction heads that have symmetrical zones, the suction head can be aligned with a target item using a great degree of accuracy. This reduces and, in some cases, entirely eliminates the chance of accidentally picking up items surrounding the target item.

Some inventory storage and retrieval systems handle diverse item sets, e.g., dimensions, shapes, weights, surface properties, and characteristics of items may be different. In these systems, use of the end of arm tools described herein may increase eligibility (e.g., percentage of inventory that can be manipulated by a robotic manipulator) and reliability (e.g., a success rate for manipulating eligible items) as compared to traditional methods that do not utilize full rotation coupled with asymmetrical independently controllable suction zones. In addition, the sizes and shapes of the suction zones described herein may be selected to maximize geometric eligibility (e.g., ability of a suction area to fit inside package surface area), and the ability to independently operate each suction zone may maximize moment eligibility (e.g., ability of end of arm tool to overcome moment loads of various packages).

Turning now to a particular example, a robotic manipulator such as a robotic arm is outfitted with a vacuum pump and an end of arm tool. The end of arm tool includes a stator and rotor that form a rotational joint. The end of arm tool can freely rotate about this rotational joint (e.g., about 360 degrees). The rotational joint also defines an air pathway for transferring air between the vacuum pump and solenoid valves on the rotor. The rotational joint also provides an electrical pathway in the form of an electrical slip ring or a hollow cylinder that extends through the center of the rotational joint. The hollow cylinder, when provided, is used as a pathway for passing electrical cables through the rotational joint (e.g., to power the solenoid valves, sensors, etc.). The end of arm tool also includes a compliance mechanism, an end of which is connected to the rotor. The compliance mechanism includes a spring that absorbs impact forces observed at a distal end of the end of arm tool as the distal end is brought into contact with a target item. The end of arm tool also includes a suction manifold connected to an opposite end of the compliance mechanism. The suction manifold includes multiple different asymmetrical chambers defining multiple different asymmetrical suction zones. Each chamber is independently connected to one of the solenoid valves by way of a pneumatic line, and thereby each chamber is independently controllable by a solenoid valve. Each suction zone includes at least one suction device such as a suction cup.

Turning now to the figures, FIG. 1 illustrates a perspective view of item manipulation system 100 including a robotic manipulator 102 and an end of arm tool 104 having a suction manifold 106 including asymmetrical independently controllable suction zones, according to at least one example. The item manipulation system 100 also includes a management device 108 and a vacuum pump 110 (e.g., any suitable pump cable of producing a negative pressure at the suction manifold 106). While illustrated in FIG. 1 as being adjacent to the robotic manipulator 102, the management device 108 and the vacuum pump 110 may also be located remote from the robotic manipulator 102. For example, the management device 108 may form part of a computer station at which the system 100 is implemented or may be located at a different facility altogether (e.g., control signals may be passed over a network connection). In some examples, the vacuum pump 110 may be shared among more than one robotic manipulator 102 (e.g., a single vacuum pump 110 may provide suction for multiple robotic manipulators 102).

The robotic manipulator 102 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, gantries, overhead lift modules, and any other suitable material handling equipment that interacts with or otherwise handles objects) that is operable by the management device 108 (e.g., a computing device or other electronic controller).

The robotic manipulator 102 may include any suitable type and number of sensors disposed throughout the robotic manipulator 102 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 102, including the end of arm tool 104. The sensors may include any suitable combination of sensors capable of detecting depth of objects, capturing RGB and other images of objects, scanning machine-readable information, capturing thermal images, detecting position and orientation of objects, and performing any other suitable sensing as described herein.

As described in detail herein, the end of arm tool 104 includes a rotational joint 112 that enables rotation of a substantial part of the end of arm tool 104 about a tool axis 114, as illustrated by rotational arrows 116. The tool axis 114 is defined as extending axially through a center of the end of arm tool 104. This rotational capability of the end of arm tool 104 enables precise positioning of the suction manifold 106 with respect to a target item. For example, the end of arm tool 104 may be rotatable at least 300 degrees and, in some examples, a full 360 degrees of rotation may be achieved. As the end of arm tool 104 may be rotated in a clockwise and counterclockwise direction, and when combined with the other degrees of freedom of the robotic manipulator 102, the suction manifold 106 may be oriented in almost any suitable rotational orientation. As described herein, rotation of the end of arm tool 104 may be represented as the number of degrees of rotation, which may include a total combined number of degrees in two directions (e.g., 180 degrees of rotation can mean 90 degrees of counterclockwise rotation and 90 degrees of clockwise rotation) or the total number of degrees in one direction (e.g., 180 degrees of rotation can mean 180 degrees of counterclockwise rotation and 180 degrees of clockwise rotation). In some examples, the end of arm tool 104 may provide for infinite degrees of rotation, e.g., the end of arm tool 104 may freely rotate through multiple revolutions in one or both directions.

As described in detail herein, the end of arm tool 104 also includes the suction manifold 106. The suction manifold 106 includes multiple asymmetrical independently controllable suction zones. Depending on characteristics of a target item, different zones may be turned on and turned off to increase the probability that the target item is picked successfully and adjacent items are left behind. This enables the item manipulation system 100 to successfully and efficiently singulate items from a set of items (e.g., a pile items of varying shapes, sizes, and surface properties).

As described in detail herein, the end of arm tool also includes a compliance mechanism 118. The compliance mechanism 118, which is connected to the suction manifold 106, is configured to provide compliance to the suction manifold 106. In particular, the compliance mechanism 118, which includes one or more springs or other biasing device (s), controls translation of the suction manifold 106 along the tool axis 114, e.g., in the directions indicated by translation arrows 119.

The management device 108 may be configured to manage the operation of the robotic manipulator 102 (e.g., moving the robotic manipulator through different poses and orientations to position the end of arm tool 104), manage operation of the vacuum pump 110 (e.g., turning on and off the pump, adjusting suction levels, etc.), manage the operation of the end of arm tool 104 (e.g., rotating the end of arm tool 104 to align suction zone(s) of the suction manifold 106 with an item), and manage operation of the suction manifold 106 (e.g., opening and closing valves to selectively apply suction in different suction zones of the suction manifold 106). In some examples, the management device 108 may be distributed at one or more locations. For example, a first management device 108 may be local to the robotic manipulator 102 and include hardware and firmware and a second management device 108 may be remote from the robotic manipulator 102 and include software. The management device 108 may include any suitable combination of software, firmware, processors, memory devices, specialized chips, sensors, and the like to implement the techniques described herein. In some examples, the management device 108 receives instructions over a network from a server to perform the techniques described herein.

The item manipulation system 100 is configured to manipulate various types of items such as items having a wide variety of different characteristics. Such items may include, for example, envelopes, bubble mailers, jiffy padded envelopes, personal electronic devices, computers, recreational equipment, food products, television sets, clothing, household supplies, automotive parts, appliances, books, and any other suitable object capable of being manipulated by the item manipulation system 100.

Figure 2:
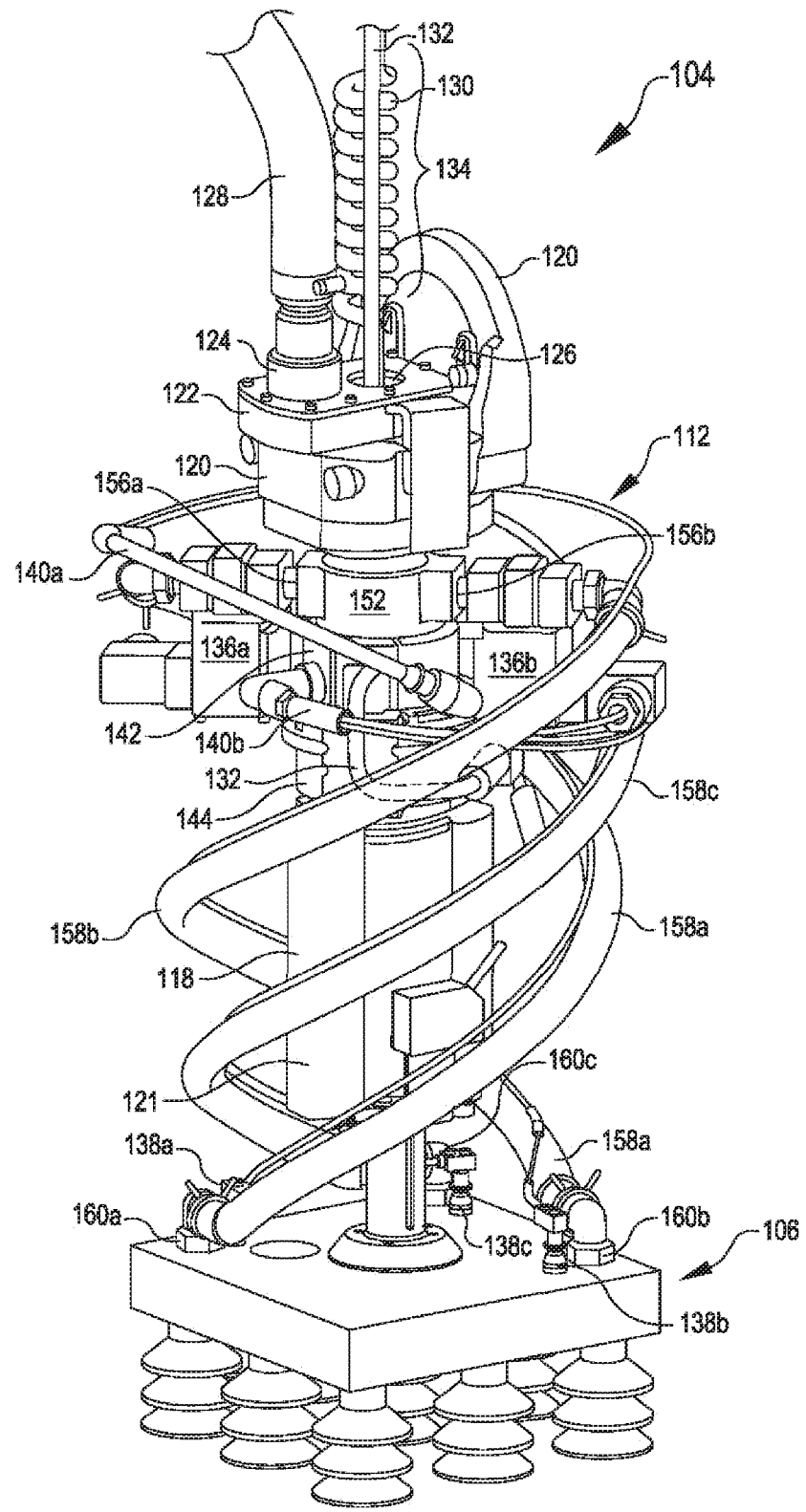
FIG. 2 illustrates a first perspective view of the end of arm tool from FIG. 1, according to at least one example.
Figure 3:
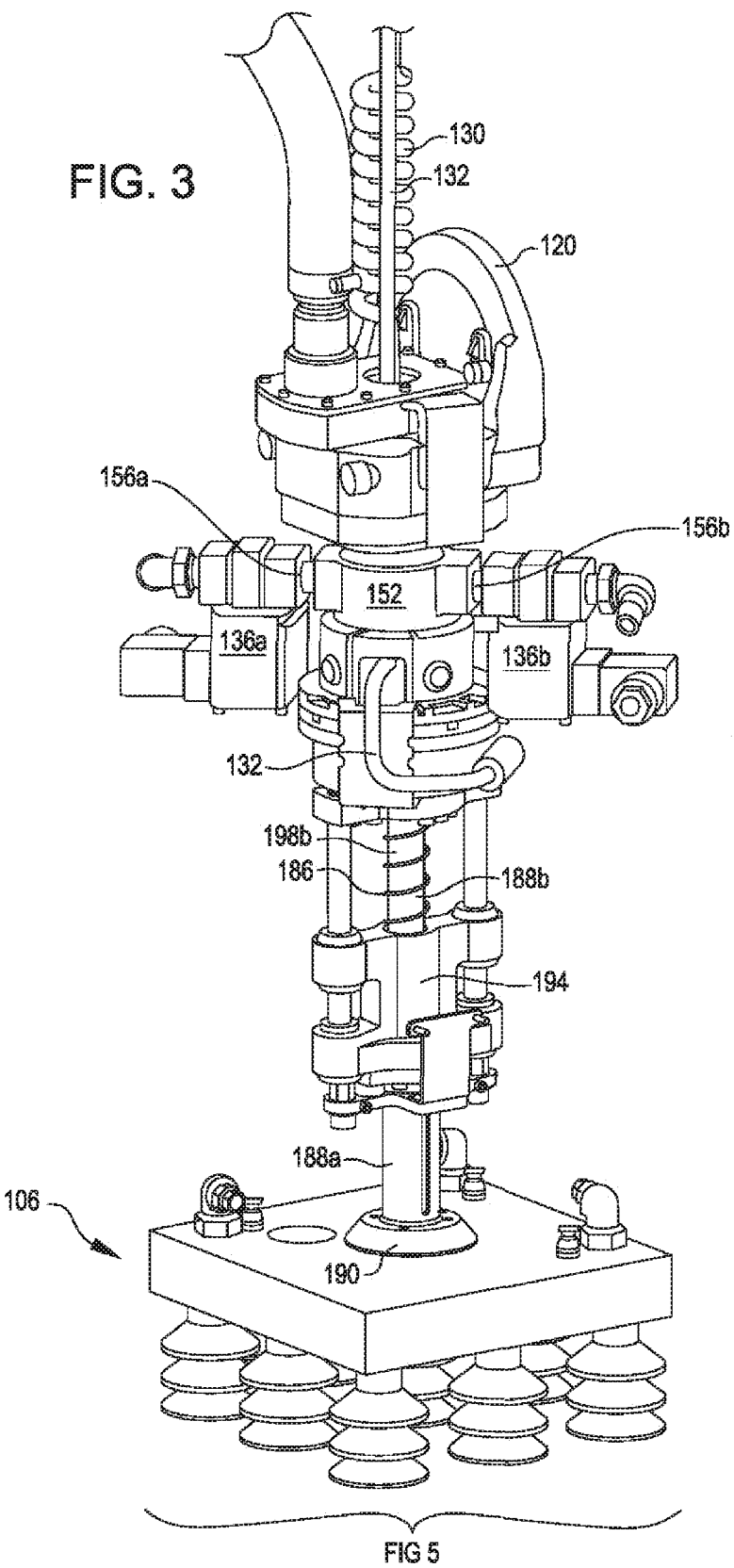
FIG. 3 illustrates a second perspective view of the end of arm tool from FIG. 1, according to at least one example.

FIGS. 2 and 3 illustrates perspective views of the end of arm tool 104, according to various examples. In particular, FIG. 2 illustrates a view of the end of arm tool 104 that is fully operational, while FIG. 3 illustrates a view of the end of arm tool 104 with various components removed for illustrative purposes.

The end of arm tool 104 is connectable to the robotic manipulator via an end of arm mounting joint 120. Components of the end of arm tool 104 that do not rotate about the tool axis 114 are connected to a portion of the end of arm mounting joint 120. In particular, a stator rotary union 122, which includes a pneumatic outlet 124 and a pathway opening 126, is connected to the end of arm mounting joint 120. A primary pneumatic hose 128 is connected to the pneumatic outlet 124 and extends to the vacuum pump 110. The vacuum pump 110 pulls a vacuum at the suction manifold 106 via the primary pneumatic hose 128.

The pathway opening 126 extends through a center of the components that make up the rotational joint 112 and is sized to receive electrical cables 130 and 132. Because the pathway opening 126 extends through the center of the rotational joint 112 within a centerbore 146 of a rotary cavity 148 (e.g., see FIG. 4), the rotating portion of the end of arm tool 104 can rotate without tangling the electrical cables 130 and 132 around the end of arm tool 104. However, because the electrical cables 130 and 132 are still subjected internal stresses from the rotation, the electrical cable 130 includes a helical coil 134. The helical coil 134 absorbs rotational stresses as they electrical cable 130 is rotated about the tool axis 114. In some examples, the electrical cable 132 also includes a helical coil.

Generally, the electrical cable 130 provides power to the electrical components of the end of arm tool 104 and/or transfers data signals. For example, the electrical cable 130 provides power to solenoid valves 136 and pressure sensors 138. The electrical cable 130 exits at a bulkhead connector 142 and extends into various strands 140 to the respective electrical components. The bulkhead connector is located between the rotor rotary union 152 and a force-torque (FT) sensor 144.

The electrical cable 132 also provides power to the FT sensor 144. The FT sensor 144 is configured to measure forces and torques experienced by the end of arm tool 104. Sensing data from the FT sensor 144 can be used to adjust manipulation strategies on the fly and in the future. In some examples, the FT sensor 144 may be used to estimate the mass of a package that has been picked by the end of arm tool 102. An example process may include picking the package from a pick point to perch at a slow acceleration (e.g., around 20% of maximum acceleration), reading the FT sensor 144 for a fixed number of cycles (e.g., 10) during the pick point to perch move, estimating the mass of the package based on the force data read by the FT sensor 144, calculating acceleration value that should be used for the package and storing it in a register, and using the calculated acceleration value to move the package from perch to place.

The end of arm tool 104 may also include a laser sensor connected to a portion of the end of arm tool 104. In some examples, the robotic manipulator 102 includes the laser sensor. The laser sensor may be any suitable distance measuring device suitable for measuring distances between components of the end of arm tool 104 and/or the robotic manipulator 102 and some other object. Sensing data from the laser sensor may be used (e.g., by the management device 108) to a measure of offset from the end of arm tool 102 to a conveyor or other pick surface. For example, the laser sensor may be directed toward the pick surface in order to measure a distance between the suction manifold 106 and the pick surface. This may be desirable to determine a ground truth position of various components with which the end of arm tool 104 and/or the robotic manipulator 102 interacts. Sensing data from the laser sensor may also be used (e.g., by the management device 108) determine the alignment between the end of arm tool 104 and/or the robotic manipulator 102 and the pick scene by spotting a target placed on the pick scene. This may be desirable to understand the differences of components at the station due to tolerance of manufacturing of the components at the station.

The end of arm tool 102 may also include the compliance mechanism 118 that is connected to a bottom portion of the FT sensor 144 and a top portion of the suction manifold 106. As illustrated in FIG. 2, the compliance mechanism 118 includes a shroud 121 that encases at least a portion of the compliance mechanism 118.

Figure 4:
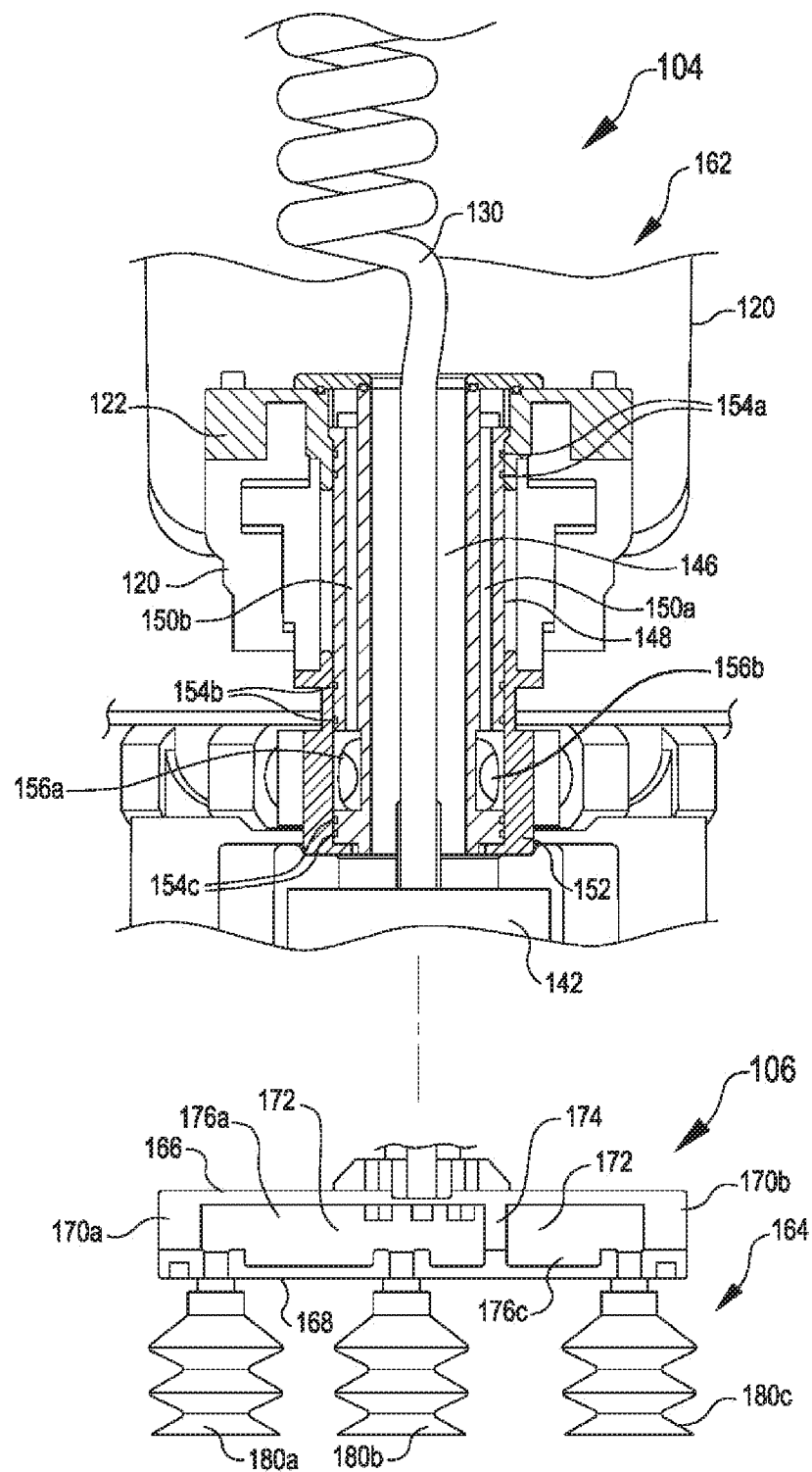
FIG. 4 illustrates side profile views of the end of arm tool from FIG. 1, according to at least one example.

Referring now to FIG. 4, which illustrates an upper profile view 162 of the end of arm tool 104 from FIG. 3, the stator rotary union 122 is illustrated as being connected to the rotary cavity 148. The rotary cavity 148 includes the centerbore 146 formed at a central region and air pathways 150 formed at perimeter regions. The air pathways 150 are distributed radially and extend axially between the stator rotary union 122 and the rotor rotary union 152. The air pathways 150 are pneumatically sealed using O-ring sets 154 from the centerbore 146 and the air outside of the rotary cavity 148. This enables air to be transferred through the rotational joint 112, i.e., via the air pathways 150, thereby making the rotational joint 112 a pneumatic rotational joint. Running the cables 130 and 132 via the centerbore 146 makes the rotational joint 112 an electrical rotational joint. With both added functionalities, the rotational joint 112 becomes an electro-pneumatic rotational joint 112. The bulkhead connector 142 is also illustrated in FIG. 4 as being connected to the stator rotary union 122.

Referring again to FIGS. 2 and 3, the rotor rotary union 152 includes a plurality of union pneumatic outlets 156. The union pneumatic outlets 156 are in pneumatic communication with the air pathways 150. The number of union pneumatic outlets 156 corresponds to the number of suction zones in the suction manifold 106. Thus, in the illustrated example, the rotor rotary union 152 includes three union pneumatic outlets 156. Each union pneumatic outlet 156 is opened and closed using one of the solenoid valves 136. The solenoid valves 136 are powered using the electrical cable 130. The solenoid valves 136, which may be replaced with any suitable automated valve, may be electrically controlled to open and close the union pneumatic outlets 156. This may enable the independent control of the various suction zones of the suction manifold 106, as described herein.

Pneumatic tubes 158 extend between the solenoid valves 136 and suction manifold pneumatic outlets 160. The pneumatic tubes 158 extend helically about the compliance mechanism 118. This avoids the pneumatic tubes 158 being tangled as the suction manifold 106 translates along the tool axis 114, i.e., when the compliance mechanism 118 is loaded and unloaded.

The suction manifold pneumatic outlets 160 are mounted in the suction manifold 106. Each suction manifold pneumatic outlet 160 is in pneumatic communication with a chamber of the suction manifold 106 and thereby is pneumatically isolated from the other suction manifold pneumatic outlets 160.

Figure 5:
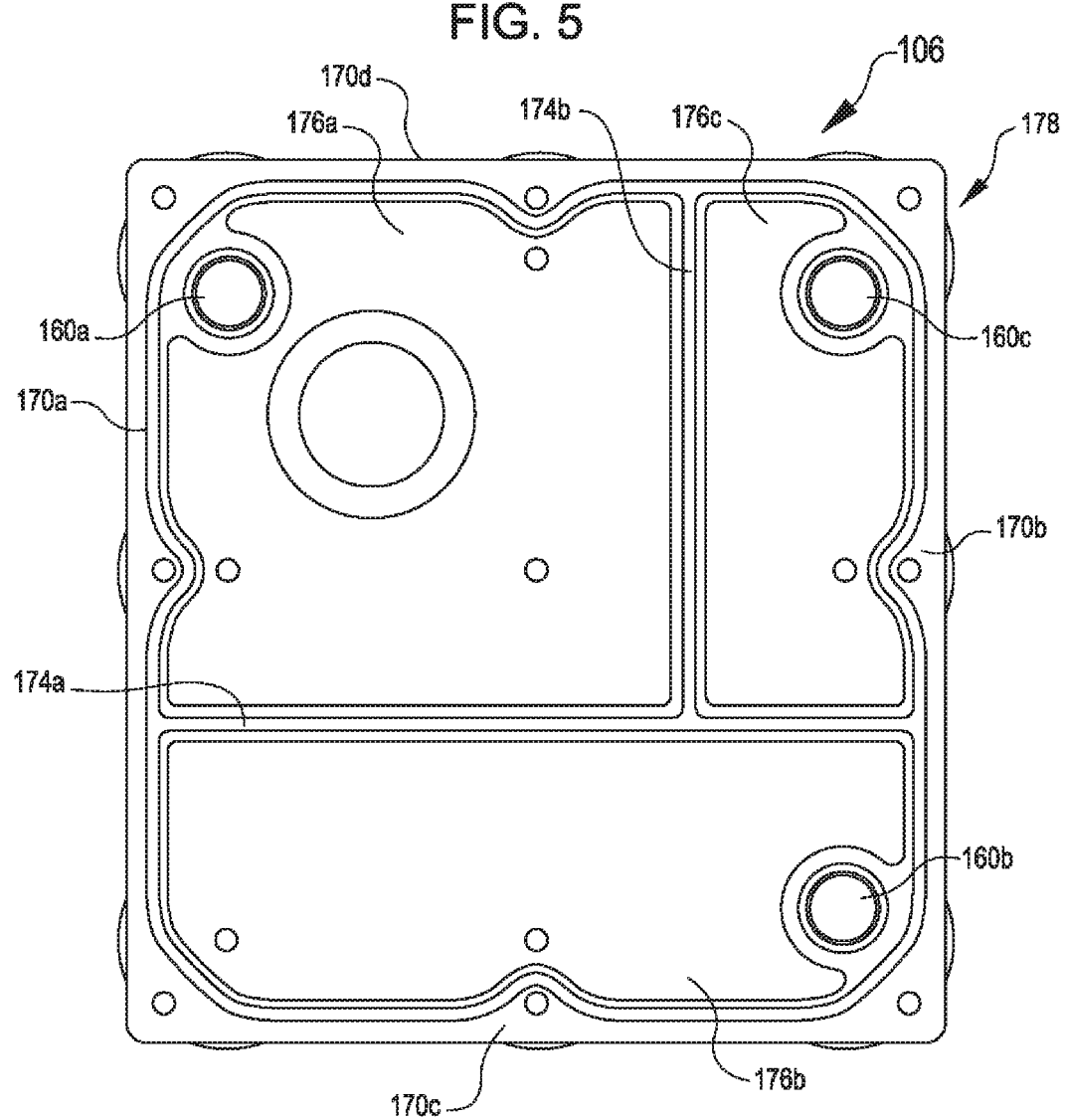
FIG. 5 illustrates a top profile view of a suction manifold, according to at least one example.

Referring to FIG. 4, FIG. 4 also illustrates a lower profile view 164 of the end of arm tool 104. In the lower profile view 164, a profile of the suction manifold 106 is provided. The suction manifold 106 is formed from a top section 166, a bottom section 168, and walls 170. In some examples, the wall 170 is formed as one piece or from multiple pieces. Together the top section 166, the bottom section 168, and the walls 170 define an interior chamber 172 having an interior volume. One or more interior walls 174 are also included within the interior chamber 172 to divide the interior chamber 172 into one or more sub-chambers 176a and 176c. The sub-chambers 176 are pneumatically isolated from each other and, as illustrated in FIG. 5, which is a top profile view 178 of the suction manifold 106, each includes a dedicated and independent suction manifold pneumatic outlet 160. As also illustrated in FIG. 5, the suction manifold 106 is divided into three sub-chambers 176a-176c by the interior walls 174a and 174b. In some examples, the suction manifold 106 may be divided into more than three sub-chambers 176 or fewer than three sub-chambers 176. As described in detail herein, the number of sub-chambers 176 corresponds to the number of suction zones.

As illustrated in the lower profile view 164 in FIG. 4, the suction manifold 106 also includes a plurality of suction devices 180a-180N. Each suction device 180, which in the illustrated example are vacuum-operated suction cups, is mounted to the bottom section 168 and in pneumatic communication with one of the sub-chambers 176.

Figure 6:
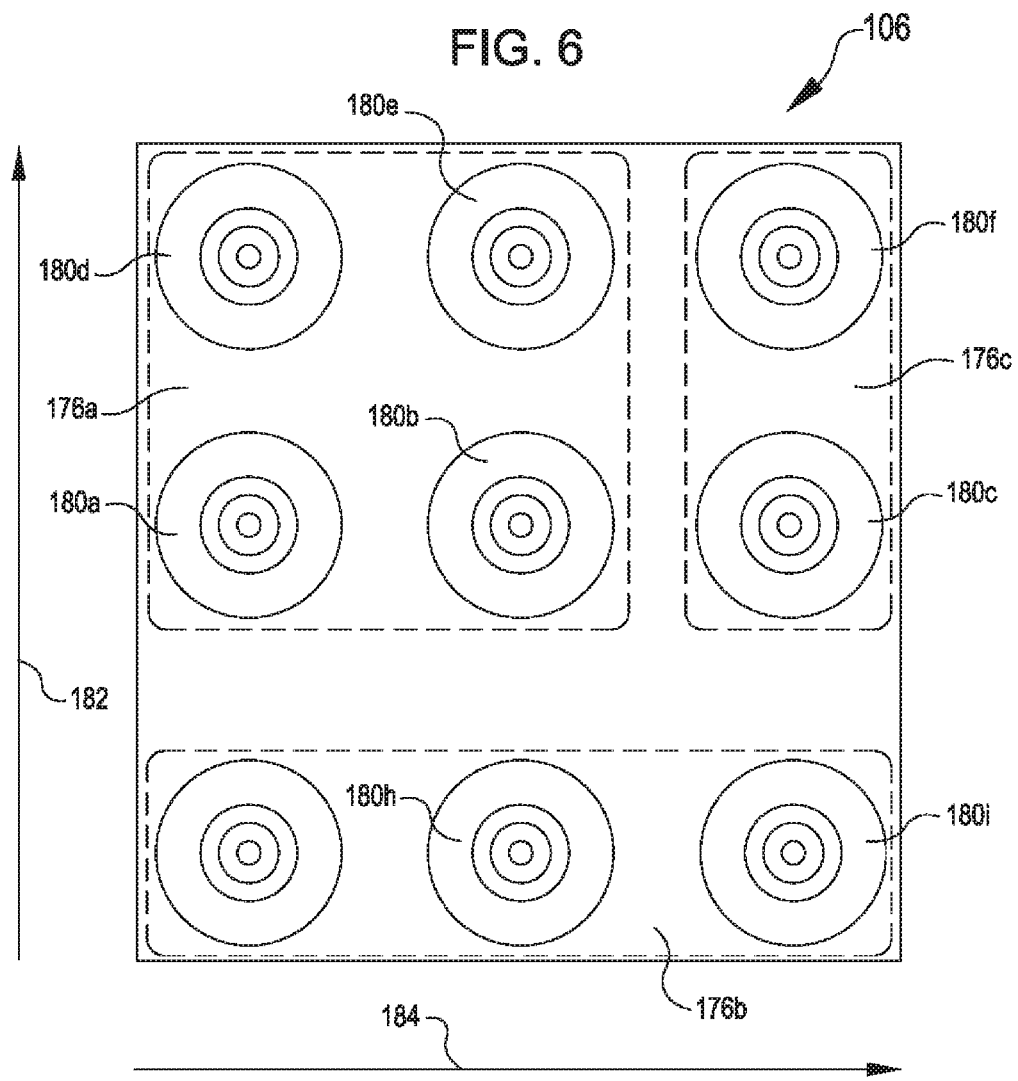
FIG. 6 illustrates a bottom view of a suction manifold, according to at least one example.

For example, as illustrated in FIG. 6, which is a bottom view of the suction manifold 106, nine suction devices 180 are mounted to the bottom section 168 and distributed within the three sub-chambers 176. The dashed lines in FIG. 6 are used to graphically indicate the boundaries between the sub-chambers 176, which also correspond to the boundaries of the suction zones. Thus, in this example, the suction manifold 106 includes three distinct suction zones, e.g., sub-chambers 176, which can be independently controlled (e.g., using a solenoid valve) to define other suction zones. For example, the suction manifold 106 illustrated in FIG. 6 may include three sub-chambers 176 each including its own solenoid valve 136. In this arrangement, by independently opening and closing the solenoid valves 136, the suction manifold 106 may define a total of seven suction zones (e.g., a first corresponding to the sub-chamber 176a only, a second corresponding to the sub-chamber 176b only, a third corresponding to the sub-chamber 176c, a fourth corresponding to all three sub-chambers 176a-176c, a fifth corresponding to the sub-chambers 176a and 176b, a sixth corresponding to the sub-chambers 176a and 176c, and a seventh corresponding to the sub-chambers 176b and 176c).

The sub-chamber 176a is associated with the suction devices 180a, 180b, 180d, and 180e. The sub-chamber 176c is associated with the suction devices 180g, 180h, and 180i. The sub-chamber 176b is associated with the suction devices 180c and 180f. Thus, in the illustrated example, the suction zone corresponding to the sub-chamber 176a includes four suction devices 180, the suction zone corresponding to the sub-chamber 176b includes three suction devices 180, and the suction zone corresponding to the sub-chamber 176c includes two suction devices 180.

The dimensions of the suction manifold 106 may be characterized by a length dimension 182 and a width dimension 184. In some examples, the length dimension 182 may be between 150 and 250 mm and the width dimension 184 may be between 150 mm and 250 mm. In some examples, the length dimension 182 may be smaller than 150 mm or greater than 250 mm, and the width dimension 184 may be smaller than 150 mm or greater than 250 mm. In some examples, the spacing between the suction devices 180, measured between center points of the suction devices 180, may be between 50 mm and 100 mm. In some examples, the spacing between the suction devices 180 may be less than 50 mm or greater than 100 mm. The distribution of the suction zones may be considered asymmetrical at least because the number of suction devices 180 per zone is non-uniform, the location of the suction zones with respect to others is non-uniform, the area dedicated to each suction zone is non-uniform, and/or the surface area per suction device in each zone may also be non-uniform. The distribution of the suction devices 180 that make up the array of suction devices may be based on experimental data. Use of the suction zones may increase geometric eligibility (ability of the suction manifold 106 to fit inside package dimensions) to account for almost all target items, and increase moment eligibility (ability of the suction manifold 106 to overcome moment) to account for almost all target items.

Figure 7:
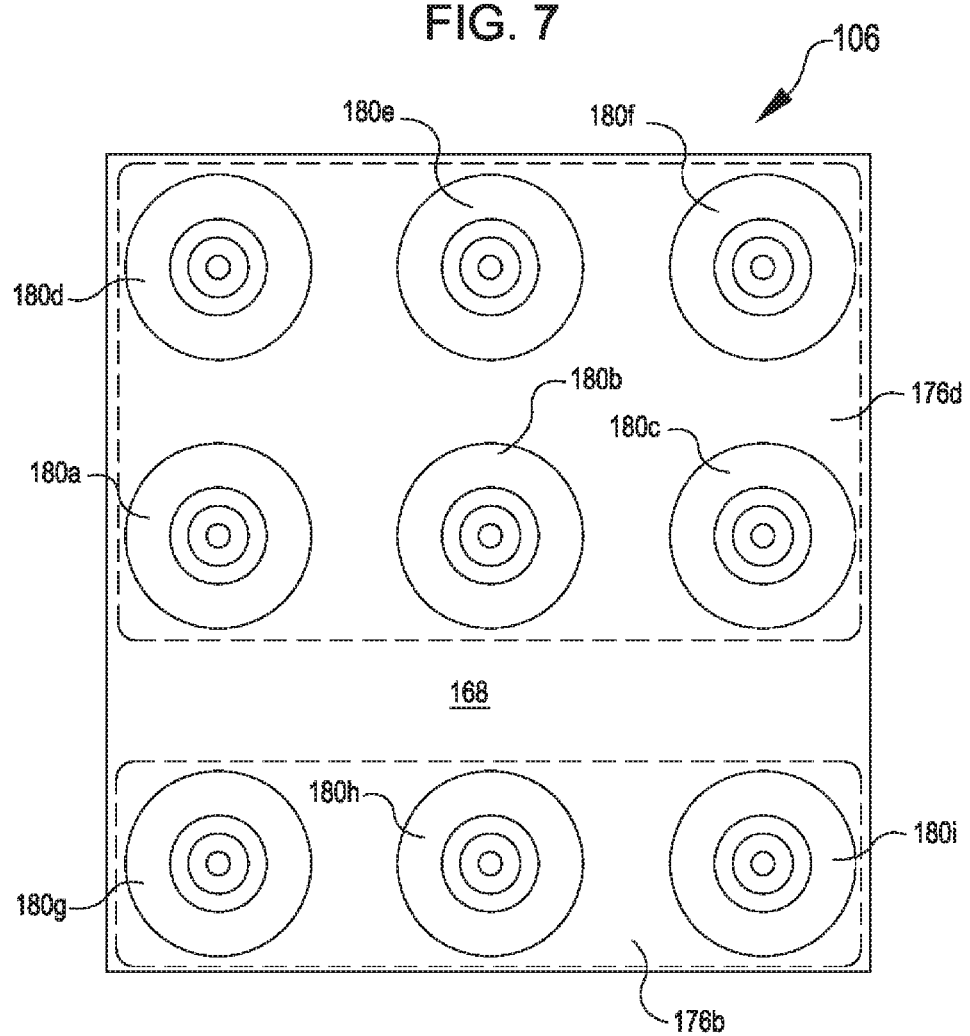
FIG. 7 illustrates a bottom view of a suction manifold, according to at least one example.

Turning now to FIG. 7, which is a bottom view of the suction manifold 106, including two sub-chambers 176. In this example, the sub-chambers 176a and 176c have been combined to form a sub-chamber 176d. Like in FIG. 7, the dashed lines are used to graphically indicate the boundaries between the sub-chambers 176, which also correspond to the boundaries of the suction zones. Thus, in this example, the suction manifold 106 includes two distinct suction zones, e.g., sub-chambers 176, which can be independently controlled (e.g., using a solenoid valve) to define other suction zones. For example, the suction manifold 106 illustrated in FIG. 7 may include two sub-chambers 176 each including its own solenoid valve 136. In this arrangement, by independently opening and closing the solenoid valves 136, the suction manifold 106 may define a total of three suction zones (e.g., a first corresponding to the sub-chamber 176d only, a second corresponding to the sub-chamber 176b only, a third corresponding to the sub-chambers 176d and 176b). Similar to the suction manifold 106 depicted in FIG. 6, the suction manifold depicted in FIG. 7 includes nine suction devices 180, which are mounted to the bottom section 168 and distributed within the two sub-chambers 176b and 176d.

Figure 8:
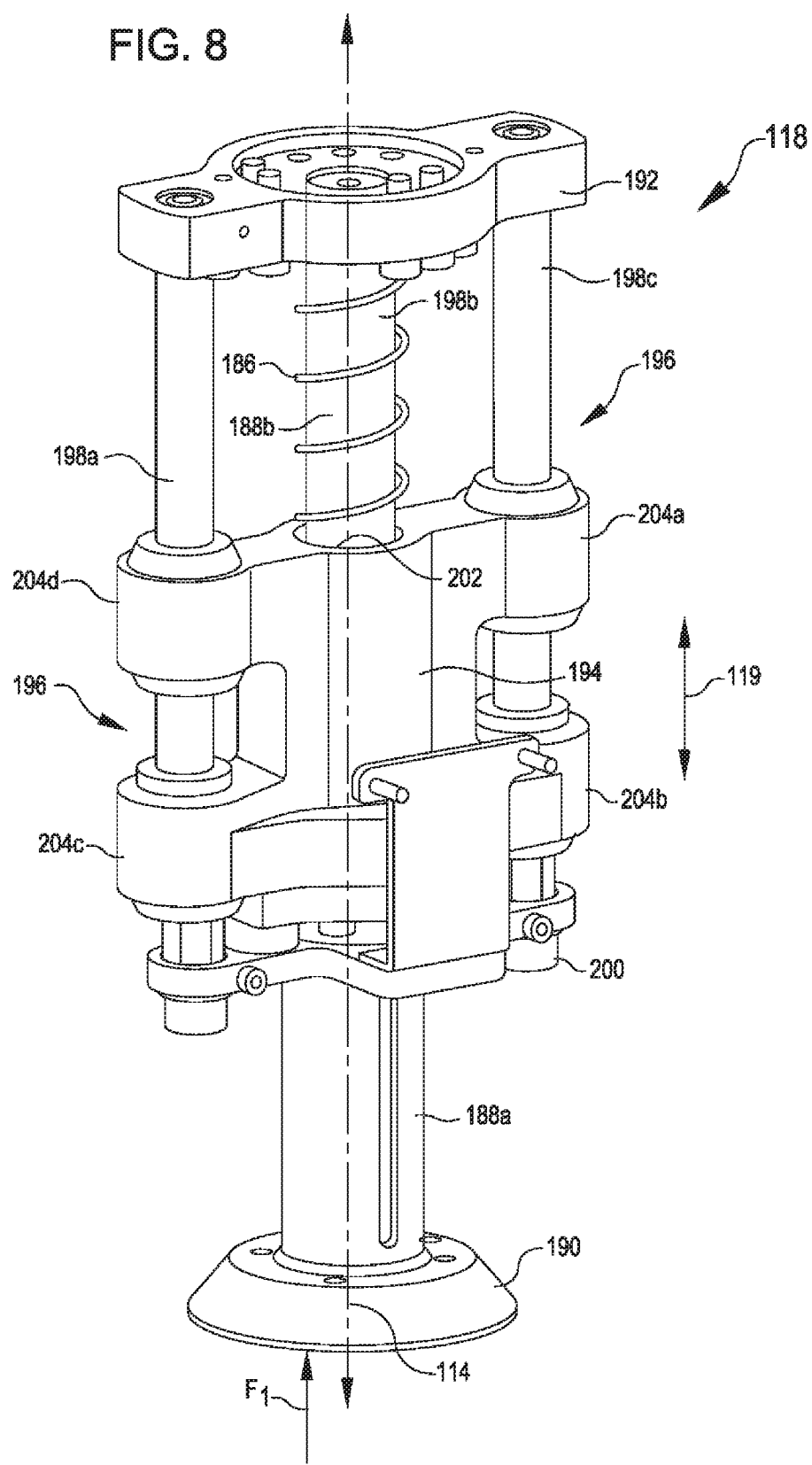
FIG. 8 illustrates a perspective view of a compliance mechanism including a coil spring, according to at least one example.

Turning now to FIG. 8, FIG. 8 illustrates a perspective view of the compliance mechanism 118 including a coil spring 186, according to at least one example. Because the compliance mechanism 118 includes the coil spring 186 (e.g., an example of a resilient linear biasing device), as the coil spring 186 is compressed, the resistive force increases. In some examples, any other suitable biasing device (e.g., gas-charged cylinder, constant force spring, etc.) may be used instead of or in addition to the coil spring 186.

In terms of components, the compliance mechanism 118 includes a post 188 extending axially along a length-wise axis (e.g., the tool axis 114). The post 188 includes a lower portion 188a and an upper portion 188b. At a distal end of the lower portion 188a is connected a bottom plate 190. The bottom plate 190 is used to connect the compliance mechanism 118 to a top surface (e.g., the lid section 166) of the suction manifold 106. A distal end of the upper portion is connected to a top plate 192. The top plate 192 is used to connect the compliance mechanism 118 to one of the FT sensor 144, the bulkhead connector 142, or the rotor rotary union 152. The coil spring 186 wraps around the upper portion 188b and extends between the top plate 192 and a cart 194.

The compliance mechanism 118 also includes a track 196 that is formed from a plurality of elongate members 198 extending axially along the tool axis 114. In the illustrated example, the track 196 is formed from the upper portion 188b of the post (e.g., the elongate member 198b) and two other elongate members 198a and 198c disposed radially with respect to the elongate member 198b. The track 196 also includes a fixed lower limiter 200. The fixed lower limiter 200 stops translation of the cart 194 in a first direction and the top plate 192 limits translation of the cart 194 in the opposite direction.

Turning now to the cart 194, the cart 194 includes a primary slide bore 202 and plurality of secondary slide bores 204a-204d. The primary slide bore 202 and the secondary slide bores 204 work in unison to rigidly enable sliding of the cart 194 on the track 196. In some examples, the bores 202 and 204 may include bushings, bearings, or other friction-reducing elements to enable smooth and consistent translation of the cart 194 in the direction of the translation arrows 119 (e.g., up and down the tool axis 114).

In practice, as a force Fi is applied at the bottom plate 190 (e.g., via the suction manifold 106 contacting an item), the cart 194 translates towards the top plate 192, thereby compressing the coil spring 186. When the force Fi is removed from the bottom plate 190, a biasing force of the coil spring 186 causes the cart 194 to translate towards the fixed lower limiter 200 at least until an equilibrium state is achieved.

Figure 9:
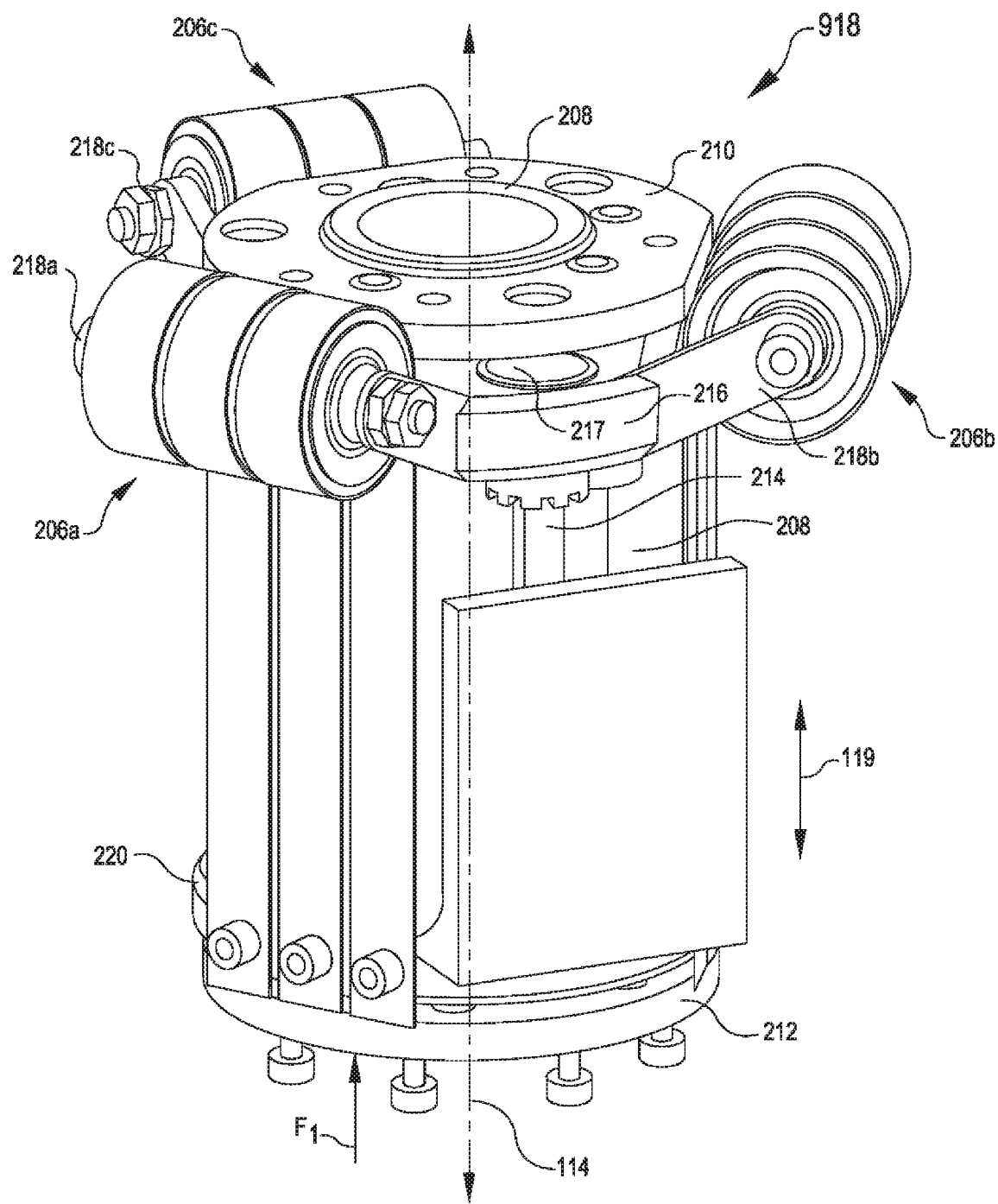
FIG. 9 illustrates a perspective view of a compliance mechanism including constant force springs, according to at least one example.

FIG. 9 illustrates a perspective view of a compliance mechanism 918 including constant force springs 206, according to at least one example. The compliance mechanism 918 may be used in place of the compliance mechanism 118 described herein. To this end, the compliance mechanism 918 may include many features that are similar to those of the compliance mechanism 118. The compliance mechanism 918 is illustrated in a compressed state.

The compliance mechanism 918 includes a post 208, a top plate 210, and a bottom plate 212. The post 208 extends axially along a length-wise axis (e.g., the tool axis 114) about the entire height of the compliance mechanism 918. The bottom plate 212 is connected to the post 208 at a distal end of the post 208. The bottom plate 212 is used to connect the compliance mechanism 918 to a top surface (e.g., the lid section 166) of the suction manifold 106. The top plate 210 is connected to an opposite distal end of the post 208. The top plate 210 is used to connect the compliance mechanism 918 to one of the FT sensor 144, the bulkhead connector 142, or the rotor rotary union 152.

The compliance mechanism 918 also includes a track that includes a plurality of elongate members 214. In the view illustrated in FIG. 9, only one of the elongate members 214 is illustrated. In some examples, compliance mechanism 918 may include three elongate members 214.

The compliance mechanism 918 also includes a cart 216 slidably mounted to the track including the elongate members 214. The cart 216 includes a plurality of slide bores 217 corresponding to the number of elongate members 214. The slide bores 217 work in unison to rigidly enable sliding of the cart 216 on the track. In some examples, the slide bores 217 may include bushings, bearings, or other friction-reducing elements to enable smooth and consistent translation of the cart 216 in the direction of the translation arrows 119 (e.g., up and down the tool axis 114). The cart 216 also includes upper spring mounts 218a-218c. The upper spring mounts 218 include a set of tabs to support a rod (e.g., an axle) upon which the constant force springs 206 are mounted.

In the example illustrated in FIG. 9, a total of nine constant force springs 206 are included, with three constant forces springs 206 mounted at each upper spring mount 218. Depending on the implementation, fewer than three per mount 218 or greater than three per mount 218 may be included. Distal ends of the constant force springs 206 are attached to a bottom limiter 220. The bottom limiter 220 is located adjacent the bottom plate 212. In some examples, the cart 216 may translate along the tool axis 114 in the direction of the translation arrows 119 with respect to the bottom limiter 220.

In practice, as a force Fi is applied at the bottom plate 212 (e.g., via the suction manifold 106 contacting an item), the cart 216 translates towards the top plate 210, thereby compressing the constant force springs 206. The constant force springs 206 may be springs that exert a constant force over the entire stroke of the compliance mechanism 918. Thus, a biasing force exerted by the constant force springs 206 may be uniform at the top of the stroke (e.g., adjacent the top plate 210) and at the bottom of the stroke (e.g., adjacent the bottom plate 212). When the force Fi is removed from the bottom plate 212, the biasing force of constant forces springs 206 causes the cart 216 to translate towards the bottom plate 212 at least until an equilibrium state is achieved.

Figure 10:
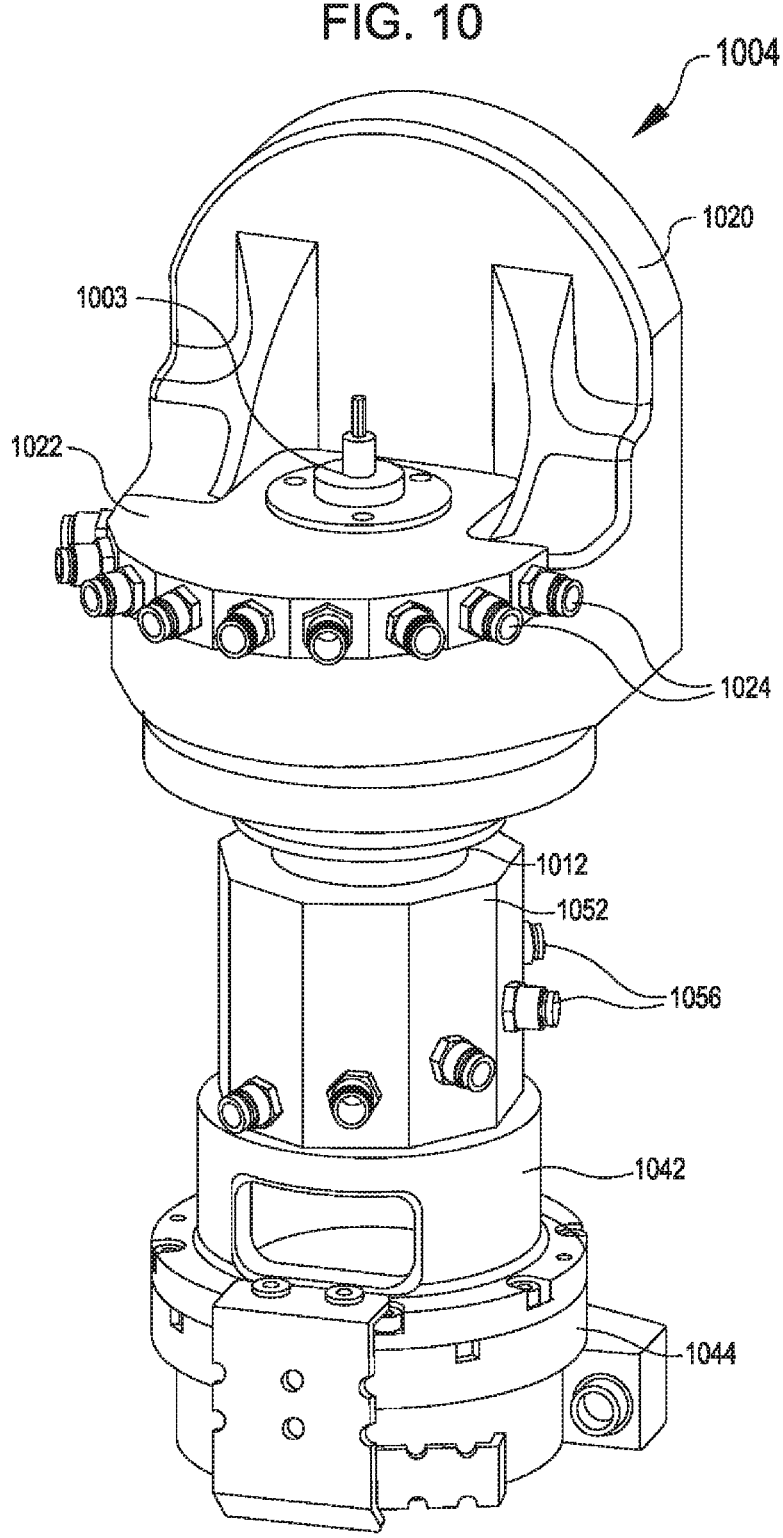
FIG. 10 illustrates a perspective view of a portion of an end of arm tool, according to at least one example.

FIG. 10 illustrates a perspective view of an end of arm tool 1004, according to at least on example. Generally, the end of arm tool 1004 is an example of the end of arm tool 104 with a few differences. In particular, the end of arm tool 1004 includes an electrical slip ring 1003, instead of the pathway opening 126. The electrical slip ring 1003 is used to transfer power through a rotational joint 1012 in a manner that does not include cables. Instead, the power cables can be connected to distal ends of the electrical slip ring 1003.

Unlike the end of arm tool 104, the end of arm tool 1004 provides for independent control of each suction device, not just independent control of a suction zone. Thus, the end of arm tool 1004 includes multiple pneumatic outlets 124, instead of just one, in a stator rotary union 1022. The end of arm tool 1004 also includes union pneumatic outlets 1056, instead of just three, in a rotor rotary union 1052. In some examples, air pathways between the pneumatic outlets 1024 and the union pneumatic outlets 1056 may be independent of each other. In this manner, applying an air suction at one of the pneumatic outlets 1024 may create a corresponding suction force at one and only one of the union pneumatic outlets 1056. The rotor rotary union 1052 also includes a plurality of union pneumatic outlets 1056. Each union pneumatic outlets 1056 may also include a solenoid valve, like the solenoid valves 136.

The end of arm tool 1004 also includes a bulkhead connector 1042 and a FT sensor 1044 configured similar to the bulkhead connector 142 and the FT sensor 144.

FIG. 11 illustrates an example flow diagram showing a process 1100 as described herein. The process 1100 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 11 illustrates a flow diagram depicting the process 1100 for implementing techniques relating to manipulating an item using the end of arm tool 104 or 1004 described herein, according to at least one example. The management device 108 of the item manipulation system 100 may perform the process 1100.

The process 1100 begins at 1102 by the management device 108 obtaining sensor data regarding one or more items. The sensor data may be collected by a sensor mounted to the robotic manipulator 102, mounted adjacent to a pick station at which the item manipulation system 100 is implemented, or mounted at any other location relative to the one or more items (e.g., at an upstream location on a conveyor belt). The items may include a stack of packages having varied characteristics (e.g., size, surface properties, type of package, etc.). The sensor data may be processed (e.g., using a computer vision algorithm, machine learning algorithm, and any other suitable technique for processing image-based sensor data) to identify a three-dimensional location (e.g., coordinates) of at least a portion of the one or more items. In some examples, the three-dimensional location corresponds to a set of corners, edges, and a surface connected the corners and edges. The management device 108 may process the sensor data to derive the location information about the items. In some examples, the process 1100 also includes the management device 108 identifying a first item from among the one or more items using the sensor data. In some examples, the first item is the item having the highest elevation (e.g., a topmost item). In some examples, information about the one or more items may be obtained by scanning barcodes, radio-frequency identification (RFID) tags, or other identifiers associated with the items. For example, the sensor data may include such scan information, by which a database of characteristic information for the items may be accessed.

At 1104, the process 1100 includes the management device 108 determining one or more suction zones of an end of arm tool for manipulating a first item of the one or more items. For example, determining the one or more suction zones may depend on estimated or known dimensions of the item, available area for picking (e.g., unobstructed area on the item), an estimated or known weight of the item, an estimated or known location of the center of gravity of the item, and an estimated or known surface property of the item, and/or any other property of the item. In some examples, the end of arm tool may include two or three asymmetrical suction zones, and in some examples, may include more than three asymmetrical suction zones.

At 1106, the process 1100 includes the management device 108 determining a rotational orientation of the end of arm tool that orients the one or more suction zones with the first item. This may include rotating the end of arm tool at a rotational joint and about a tool axis of the end of arm tool. Orienting the one or more suction zones may include orienting the suction zones within an available surface area of the first item.

At 1108, the process 1100 includes the management device 108 instructing the end of arm tool to create a suction force at the one or more suction zones. This may include causing opening of pneumatic valves associated with the one or more suction zones and closing of pneumatic valves for those suction zones of the end of arm tool that are not the one or more suction zones. For example, the management device 108 may send a signal to solenoids to open and close the relevant valves.

At 1110, the process 1100 includes the management device 108 instructing the end of arm tool to pick up the first item using the suction force. This may include instructing the end of arm tool to translate towards a top surface of the first item and allowing a compliance mechanism to absorb some of the force asserted at the end of arm tool.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a robotic manipulator; and
    an end of arm tool to detachably couple with a distal end of the robotic manipulator, the end of arm tool comprising:
        a stator rotary union comprising a first pneumatic outlet and an electrical pathway;
        a rotor rotary union rotationally connected to the stator rotary union and comprising a plurality of second pneumatic outlets, individual second pneumatic outlets of the plurality of second pneumatic outlets being independently openable and closeable;
        an electro-pneumatic rotational joint defined by the stator rotary union and the rotor rotary union, the electro-pneumatic rotational joint enabling the rotor rotary union to rotate at least 300 degrees about a tool axis with respect to the stator rotary union, defining the electrical pathway, and defining a pneumatic pathway between the first pneumatic outlet and the plurality of second pneumatic outlets; and
        a suction manifold connected to the rotor rotary union, the suction manifold comprising:
            a bottom;
            a lid comprising a plurality of third pneumatic outlets in pneumatic communication with the plurality of second pneumatic outlets;
            a perimeter wall extending between the lid and the bottom so as to define an interior chamber having an interior volume;
            at least one interior wall that divides the interior chamber into a plurality of asymmetrical sub-chambers, each asymmetrical sub-chamber defining a distinct interior sub-volume and an independent pneumatic pathway with one of the third pneumatic outlets of the plurality of third pneumatic outlets;
            a first set of suction devices connected to the bottom and in pneumatic communication with a first asymmetrical sub-chamber of the plurality of asymmetrical sub-chambers to define a first suction zone; and
            a second set of suction devices connected to the bottom and in pneumatic communication with a second asymmetrical sub-chamber of the plurality of asymmetrical sub-chambers to define a second suction zone, wherein the first suction zone and the second suction zone are independently operable.

2. The system of claim 1, wherein the end of arm tool further comprises a compliance mechanism connected to the rotor rotary union and the suction manifold, the compliance mechanism comprising at least one biasing device arranged to resist movement of the suction manifold towards the rotor rotary union along the tool axis.

3. The system of claim 2, wherein the end of arm tool further comprises:
a bulkhead connector connected to the rotor rotary union; and
a force-torque sensor connected to bulkhead connector and the compliance mechanism, the force-torque sensor receiving electrical power via the electrical pathway.

4. The system of claim 1, wherein the end of arm tool further comprises a plurality of solenoid valves operable to independently open and close the plurality of second pneumatic outlets.

5. The system of claim 1, further comprising:
a vacuum pump in pneumatic communication with the first pneumatic outlet and configured to provide suction forces at the first set of suction devices and the second set of suction devices; and
a management device configured to:
control rotation of the rotor rotary union to align at least one of the first suction zone or the second suction zone with an item for manipulation; and
control the suction forces at the first set of suction devices and the second set of suction devices by independently actuating a plurality of solenoid valves connected to the plurality of second pneumatic outlets.

6. An apparatus, comprising:
a stator rotary union comprising a first pneumatic outlet;
a rotor rotary union rotationally connected to the stator rotary union to define a pneumatic rotational joint enabling greater than 180 degrees of rotation, the rotor rotary union comprising a plurality of second pneumatic outlets in pneumatic communication with the first pneumatic outlet; and
a suction manifold connected to the rotor rotary union, the suction manifold comprising:
a plurality of third pneumatic outlets in pneumatic communication with the plurality of second pneumatic outlets; and
a suction device array comprising a plurality of suction devices, the suction device array organized into a plurality of asymmetrical suction zones, each asymmetrical suction zone comprising at least one suction device of the plurality of suction devices and being independently operable with respect to other asymmetrical suction zones of the plurality of asymmetrical suction zones.

7. The apparatus of claim 6, further comprising a rotary cavity in which is formed a plurality of pneumatic pathways, and wherein the plurality of second pneumatic outlets are in pneumatic communication with the first pneumatic outlet via the rotary cavity.

8. The apparatus of claim 6, wherein the stator rotary union further comprises at least of an electrical slip ring in electrical communication with an electrical component of the rotor rotary union, or an electrical cable comprising a helical coil in electrical communication with the electrical component.

9. The apparatus of claim 8, wherein the electrical component comprises at least one of a solenoid valve operable to open and close one of the plurality of second pneumatic outlets, a pressure sensor operable to sense a pressure condition within a first suction zone of the plurality of asymmetrical suction zones, or a force-torque sensor connected between the rotor rotary union and the plurality of suction devices and configured to sense force and torque conditions of the apparatus.

10. The apparatus of claim 8, further comprising a bulkhead connector connected between the rotor rotary union and the suction manifold, and wherein the electrical cable passes through a hollow central region of the pneumatic rotational joint and into an interior portion of the bulkhead connector.

11. The apparatus of claim 6, further comprising a plurality of pneumatic hoses pneumatically coupling individual ones of the plurality of third pneumatic outlets with individual ones of the plurality of second pneumatic outlets.

12. The apparatus of claim 6, wherein the suction manifold comprises:
a bottom;
a lid to which is connected the plurality of third pneumatic outlets;
a perimeter wall extending between the lid and the bottom so as to define an interior chamber having an interior volume; and
at least one interior wall that divides the interior chamber into a plurality of asymmetrical sub-chambers corresponding to the plurality of asymmetrical suction zones, each asymmetrical sub-chamber of the plurality of asymmetrical sub-chambers defining a distinct interior sub-volume.

13. The apparatus of claim 12, wherein the plurality of suction devices are connected to the bottom of the suction manifold and are each in pneumatic communication with at least one asymmetrical sub-chamber of the plurality of asymmetrical sub-chambers.

14. The apparatus of claim 6, wherein the number of suction devices in the plurality of suction devices is nine, a first asymmetrical suction zone of the plurality of asymmetrical suction zones comprises six suction devices, and a second asymmetrical suction zone of the plurality of asymmetrical suction zones comprises three suction devices.

15. The apparatus of claim 6, further comprising a compliance mechanism connected to the rotor rotary union and the suction manifold.

16. The apparatus of claim 15, wherein the compliance mechanism comprises:
a post connected to a top surface of the suction manifold;
a track comprising:
a top connected to the rotor rotary union; and
a base that supports a plurality of members that extend along a tool axis between the base and the top;
a cart slidably mounted on the track and configured to translate along the tool axis; and
a coil spring wrapped around a middle member of the plurality of members and biased between the cart and the top.

17. The apparatus of claim 15, wherein the compliance mechanism comprises:
a post extending axially along a tool axis between the rotor rotary union and the suction manifold;
a top plate connected to the rotor rotary union and the post;
a bottom plate connected to a top surface of the suction manifold and the post;

a track comprising a plurality of members disposed radially about the post and extending axially along the tool axis;
a cart slidably mounted to the track and configured to move along the tool axis between a first position at which the cart is adjacent the top plate and a second position at which the cart is adjacent the bottom plate; and
a plurality of constant force springs disposed radially about the cart and connected to the cart and a bottom limiter.

18. An apparatus, comprising:
a rotor rotary union comprising a pneumatic manifold comprising a plurality of first pneumatic outlets; and
a stator rotary union connected to the rotor rotary union to define a rotational joint, the stator rotary union comprising a pneumatic manifold;
a rotary cavity coaxially aligned with a tool axis and extending axially within the stator rotary union, a plurality of pneumatic pathways formed at a perimeter region of the rotary cavity, and a cable pathway formed in a central region of the rotary cavity, first ends of the plurality of pneumatic pathways in pneumatic communication with the pneumatic manifold, second ends of the plurality of pneumatic pathways in pneumatic communication with the plurality of first pneumatic outlets; and
a suction manifold connected to the rotor rotary union and in pneumatic communication with the plurality of first pneumatic outlets, the suction manifold comprising multiple asymmetrical independently controllable suction zones.

19. The apparatus of claim 18, wherein each asymmetrical independently controllable suction zone comprises at least one suction device controllable by a solenoid valve disposed at a first pneumatic outlet of the plurality of first pneumatic outlets.

20. The apparatus of claim 18, wherein the rotor rotary union is configured to rotate at least 300 degrees about a tool axis.

* * * * *